Aug. 31, 1937.   C. PALUCK   2,091,486
LUBRICATING MEANS FOR DOUBLE DISK GRAIN DRILLS
Filed June 8, 1936
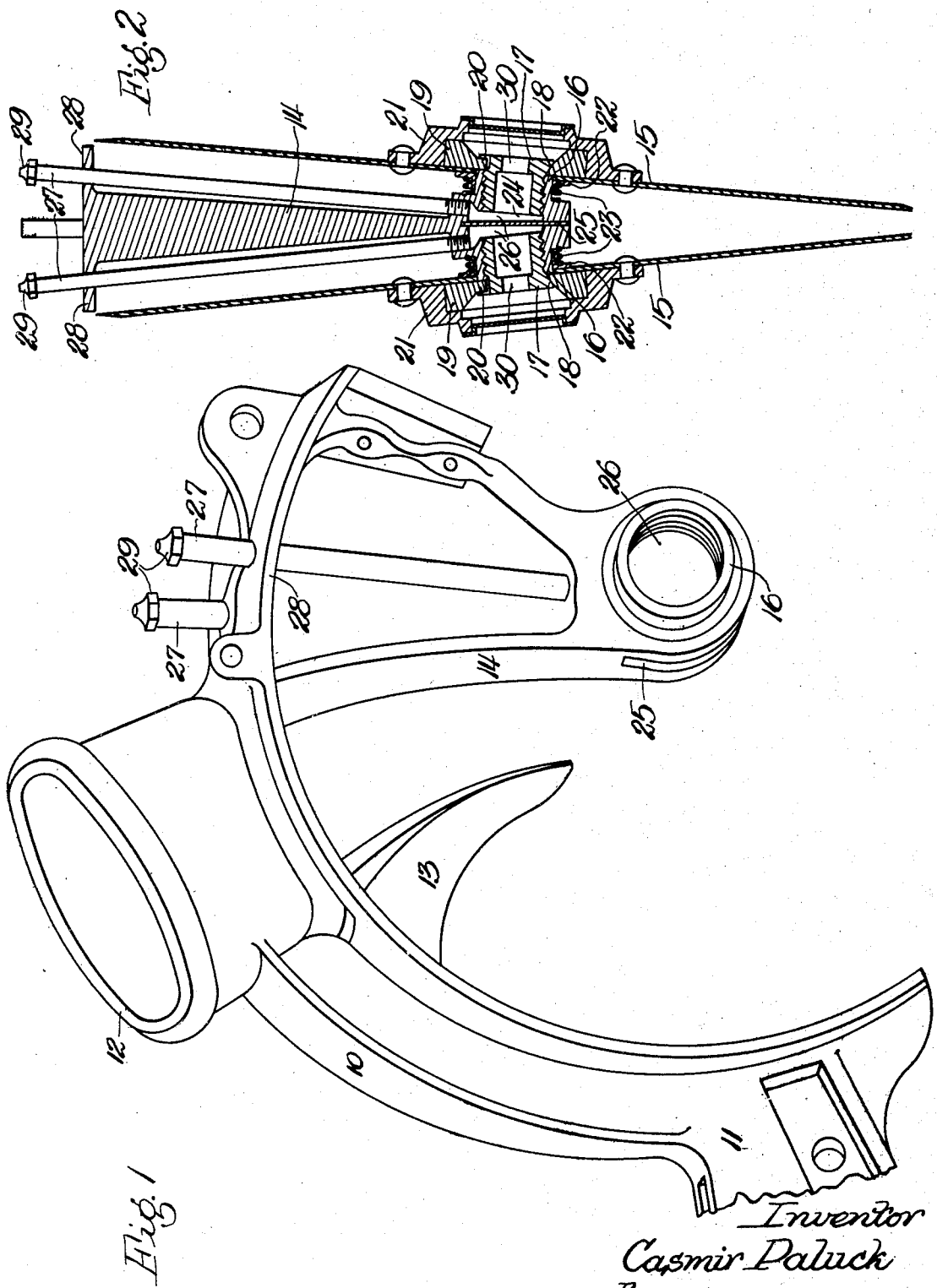
Inventor
Casmir Paluck
By V. F. Lamagne
Atty Patented Aug. 31, 1937

2,091,486

UNITED STATES PATENT OFFICE 2,091,486

LUBRICATING MEANS FOR DOUBLE DISK GRAIN DRILLS

Casmir Paluck, Belfield, N. Dak.

Application June 8, 1936, Serial No. 84,088

6 Claims. (Cl. 308—19)

This invention relates to furrow openers for grain drills. More specifically it relates to improvements in lubricating means for double disk furrow openers.

In the use of double disk furrow openers in the past, lubrication has been provided by various means directly to the two bearing surfaces. As the disks operate under very adverse conditions with pulverized soil continually dropping over the outside of the bearings, great difficulty has been encountered in obtaining satisfactory life for any type of bearing. With the advent of the high pressure lubricating means conventionally spoken of as hydraulic, double disk furrow openers have been lubricated by a conduit extending from a reservoir to a point above the disks. Oil or suitable grease under pressure was supplied through a fitting to the lubricant conduit. Lubricant from the reservoir was delivered through suitable passages formed in the bearing supports to the bearings of the individual disks. This method of lubrication has proved inadequate, and it has been found impossible to satisfactorily lubricate double disk furrow openers. The principal reason for failure is that bearing clearances and wear always differ somewhat in the two bearings of the furrow opener. When lubricant is supplied under pressure to the reservoir, it is forced into one bearing without being supplied to the other bearing. Even when the supply of lubricant is continued until it is forced through the bearing to the outside of the disk, it does not follow that the other bearing receives lubricant. As a matter of actual practice it has been found that one bearing receives less lubricant until it runs dry and quickly destroys the bearing surface. The effect of temperature on the oil viscosity also complicates the problem. There are always different conditions in the separate bearings which make the resistance to hydraulic pressure in one bearing greater than in the other. There is also another important point to be considered. When one bearing wears sufficiently to allow escape of lubricant, the supply is also drained from the other bearing with the result that, when this condition arises, both of the bearings are damaged due to insufficient lubrication.

The principal object of the invention is to overcome the difficulties above pointed out by providing a separate reservoir for each bearing of a double disk furrow opener and by supplying lubricant under pressure independently to each of the reservoirs.

A more specific object is the construction of a disk boot and its associated parts to incorporate an independent supply of lubricant to each disk bearing.

These objects and others relating to the construction of the parts will be apparent from the detailed description to follow.

In the drawing,—

Figure 1 is a perspective view of a drill boot incorporating the lubricant supply means of the invention; and, Figure 2 is a substantially vertical section taken through a drill boot, as shown in Figure 1, with the furrow opening disks mounted in position on the boot.

Figure 1 illustrates a drill boot 10 of conventional construction used with double disk furrow openers. The drill boot is supported by an extension 11 on a drag-bar, which has not been illustrated. Said drag-bar is pivotally connected to the drill frame to allow movement in a vertical direction of the drill boot. A hopper 12 is incorporated on the drill boot for the delivery of seed from flexible seed tubes, as used on drills of this type. The drill boot is of sufficient width at the top to form an inlet for seed from the hopper 12. A deflector 13 extending downwardly directs the seed into the proper location with respect to the furrow opener. A bracket or standard 14, formed as an integral part of the boot casting, extends downwardly to provide means for supporting a pair of furrow opening disks 15. The bracket 14 is provided with oppositely directed bosses 16 internally threaded to provide means for securing disk supporting members 17. It is to be understood that the threads in one of the bosses is left hand with respect to the other to prevent unscrewing of the securing members 17 when the disks are moving in the forward direction. The securing members 17 are provided with conical heads 18 which fit into conical bores formed in bearing members 19. In order to prevent rotation of the supporting members 17 with respect to the bearing members 19, notches are formed in the conical heads 18. Lugs 20 formed on the bearing members 19 engage said notches when the heads are seated in tightened position.

The bearing members 19 rotatably fit into hubs 21 riveted to the disks 15. Bearing surfaces are provided thereby on each face of the bearing members 19 and around the periphery thereof.

In order to form a seal against the entrance of dirt to the bearing and the escape of lubricant therefrom, a sealing member 22, L-shaped in cross section, surrounds the outside of each boss 16 and is held in position abutting the adjacent disk 15, by spring 23.

A chamber 24 is cored out of the bottom of the bracket 14. Said chamber is divided by a plate 25 into lubricant reservoirs 26 at each side of the plate. Said reservoirs are supplied with lubricant by conduits 27 threaded into the reservoirs and extending upwardly through lateral flanges 28 formed as integral parts of the drill boot 10. Fittings 29 are secured to the upper ends of the conduits 27 for the supply of lubricant thereto by high pressure hydraulic devices, as conventionally used on fittings of this type.

The supporting members 17 are provided with lubricant passages 30 therethrough to form means of communication between the oil reservoirs 26 and the outer ends of the bearing members 19. Lubricant passes from said outer ends along the outer faces of the bearing members 19, over the peripheral faces thereof, and along the inner faces thereof. By supplying lubricant independently under pressure to each of the disk bearings the bearing surfaces may be thoroughly lubricated, and the dirty grease may be extruded from the bearing surfaces outside of the disk. This feature makes it possible to adequately supply each bearing with lubricant with a certainty impossible when the lubricant supply to the disks comes from a common chamber.

The operation of a furrow opener as above described is well known and does not need additional explanation in this application. The problem of supplying lubricant to the disk bearings has been above discussed. It is clear from the above description of the parts how the independent supply of lubricant overcomes the problems which have been encountered, and improves to a great extent the operation of a double disk furrow opener. Applicant has solved a problem which has long confronted the users of double disk furrow openers. By supplying lubricant independently to the individual bearings there is assurance of sufficient lubricant being properly distributed to the bearing surfaces. There is also assurance that the wear and leakage of one bearing does not adversely affect the bearing of the cooperating disk. This reduces the cost of maintenance and repair. Other advantages are apparent from the description and explanation given in the above specifications.

It is to be understood that applicant has shown and described his improved lubricating device only in connection with a particular type of double disk furrow opener. It is to be further understood that the improved lubrication system may be used with any double disk furrow opener, and applicant limits his claim to invention only by the scope of the appended claims.

What is claimed is:

1. In a grain drill having a disk supporting standard, the combination of disk supporting means oppositely extending from the bottom of said standard, a pair of furrow opening disks independently rotatably mounted on said means at an angle with respect to each other, independent oil reservoirs formed in the lower end of the standard for each disk, and independent lubricant conduits extending from the top of the standard beyond the periphery of the disks to each of said reservoirs.

2. In a grain drill having a disk supporting standard, the combination of disk supporting means oppositely extending from the bottom of said standard, a pair of furrow opening disks independently rotatably mounted on said means at an angle with respect to each other, independent oil reservoirs formed in the lower end of the standard for each disk, and independent lubricant conduits communicating with each reservoir.

3. In a grain drill having a disk supporting standard, the combination of disk supporting means oppositely extending from the bottom of said standard, a pair of furrow opening disks independently rotatably mounted on said means at an angle with respect to each other, a chamber formed in the lower end of the standard, a wall dividing said chamber into two independent oil reservoirs for each disk, and a lubricant supply conduit communicating with each reservoir.

4. In a grain drill, a disk boot having oppositely extending bosses at the lower end and, in combination therewith, bearing members carried by said bosses, a pair of furrow opening disks independently rotatably mounted on said bearing members at an angle with respect to each other, said bearing members being formed with lubricant passages and said supporting standard being formed with lubricant reservoirs in communication with said lubricant passages, and independent lubricant passages in communication with said reservoirs.

5. In a grain drill, the combination with a central disk supporting standard having oppositely extending bosses at the lower end of bearing members carried by said bosses, a pair of disks independently rotatably mounted on said bearing members, said bearing members being formed with lubricant passages, said supporting standard being formed with independent lubricant reservoirs in communication with said lubricant passages, and independent lubricant passages in communication with said reservoirs and extending upwardly above the periphery of the disks.

6. A furrow opener for grain drills comprising a drill boot having a laterally extended upper portion and a disk supporting standard extending downwardly therefrom, disk supporting means oppositely extending from the bottom of said standard, a pair of furrow opening disks independently rotatably mounted on said means at an angle with respect to each other, independent oil reservoirs formed in the supporting means for each disk, and independent lubricant conduits extending through the laterally extended upper portion of the boot above the periphery of the disks downwardly to each of said reservoirs.

CASMIR PALUCK.